United States Patent
Capps et al.

(10) Patent No.: US 10,416,815 B2
(45) Date of Patent: *Sep. 17, 2019

(54) NEAR-INFRARED EMITTING TOUCH SCREEN

(71) Applicant: TEXAS INSTRUMENTS INCORPORATED, Dallas, TX (US)

(72) Inventors: Marshall Charles Capps, Farmers Branch, TX (US); Dana Franklin Segler, Jr., Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,234

(22) Filed: Aug. 6, 2018

(65) Prior Publication Data

US 2018/0341368 A1     Nov. 29, 2018

Related U.S. Application Data

(63) Continuation of application No. 14/588,271, filed on Dec. 31, 2014, now Pat. No. 10,042,478.

(51) Int. Cl.
*G06F 3/042* (2006.01)
*G03B 21/10* (2006.01)
(Continued)

(52) U.S. Cl.
CPC ........... *G06F 3/0425* (2013.01); *G03B 17/54* (2013.01); *G03B 21/10* (2013.01); *G03B 21/62* (2013.01);
(Continued)

(58) Field of Classification Search
CPC .......... G06F 3/0304; G06F 3/02; G06F 3/042; G06F 3/0421; G06F 3/0425;
(Continued)

(56) References Cited

U.S. PATENT DOCUMENTS 4,208,869 A    6/1980   Hanaoka
4,775,964 A    10/1988  Alessio et al.
(Continued)

OTHER PUBLICATIONS

Weiwei Mu, et al; Direct-Current and Alternating-Current Driving Si Quantum Dots-Based Light Emitting Device; IEEE Journal of Selected Topics in Quantum Electronics, vol. 20, No. 4, Jul./Aug. 2014.

*Primary Examiner* — Hong Zhou
(74) *Attorney, Agent, or Firm* — Michael A. Davis, Jr.; Charles A. Brill; Frank D. Cimino

(57) ABSTRACT

A screen has first and second sides to receive at least one beam on the first side and to display an image on the second side opposite the first side. The beam represents the image. The first side includes a collimating structure to direct the beam from the first side through first striped regions of the screen to the second side. The screen includes second striped regions, positioned between the first and second sides, to emit near-IR light to the second side in response to an excitation source that is selected from a group consisting of an electrical excitation source and a photoluminescence excitation source. The second side includes a diffusion layer. The first side is viewable to detect a portion of the emitted near-IR light reflected back from the second side through the first striped regions to the first side. The detected portion is processable to determine a position touch on the second side.

20 Claims, 8 Drawing Sheets

(51) Int. Cl.
    *G03B 21/62*     (2014.01)
    *G09G 5/00*     (2006.01)
    *G03B 17/54*     (2006.01)
    *H04N 5/33*     (2006.01)
    *G09G 3/00*     (2006.01)

(52) U.S. Cl.
    CPC ............. *G09G 5/003* (2013.01); *G09G 3/002* (2013.01); *G09G 2300/0426* (2013.01); *H04N 5/33* (2013.01)

(58) Field of Classification Search
    CPC ............. G09G 2300/0426; H04N 5/33; G03B 21/625; G03B 21/208; G03B 21/602; G03B 21/62; G03B 21/10; G03B 21/28; G03B 37/04; G02B 3/08; G02B 27/30; G02B 5/003; G02B 6/0051; G02F 1/1335; G02F 1/133526; G02F 2001/133607
    See application file for complete search history.

(56) References Cited

U.S. PATENT DOCUMENTS

| | | | |
|---|---|---|---|
| 5,104,210 | A | 4/1992 | Tokas |
| 6,755,534 | B2 | 6/2004 | Veligdan et al. |
| 6,905,215 | B2 | 6/2005 | Segler, Jr. et al. |
| 7,345,824 | B2 | 3/2008 | Lubart et al. |
| 2003/0122780 | A1 | 7/2003 | Hendriks et al. |
| 2008/0284925 | A1 | 11/2008 | Han |
| 2009/0146992 | A1 | 6/2009 | Fukunaga et al. |
| 2009/0231515 | A1 | 9/2009 | Keam et al. |
| 2011/0096394 | A1 | 4/2011 | Liu et al. |
| 2011/0199338 | A1 | 8/2011 | Kim |
| 2012/0105341 | A1 | 5/2012 | Park et al. |
| 2012/0319999 | A1 | 12/2012 | Kamiya |
| 2014/0111652 | A1 | 4/2014 | So et al. |
| 2014/0277294 | A1 | 9/2014 | Jones et al. |

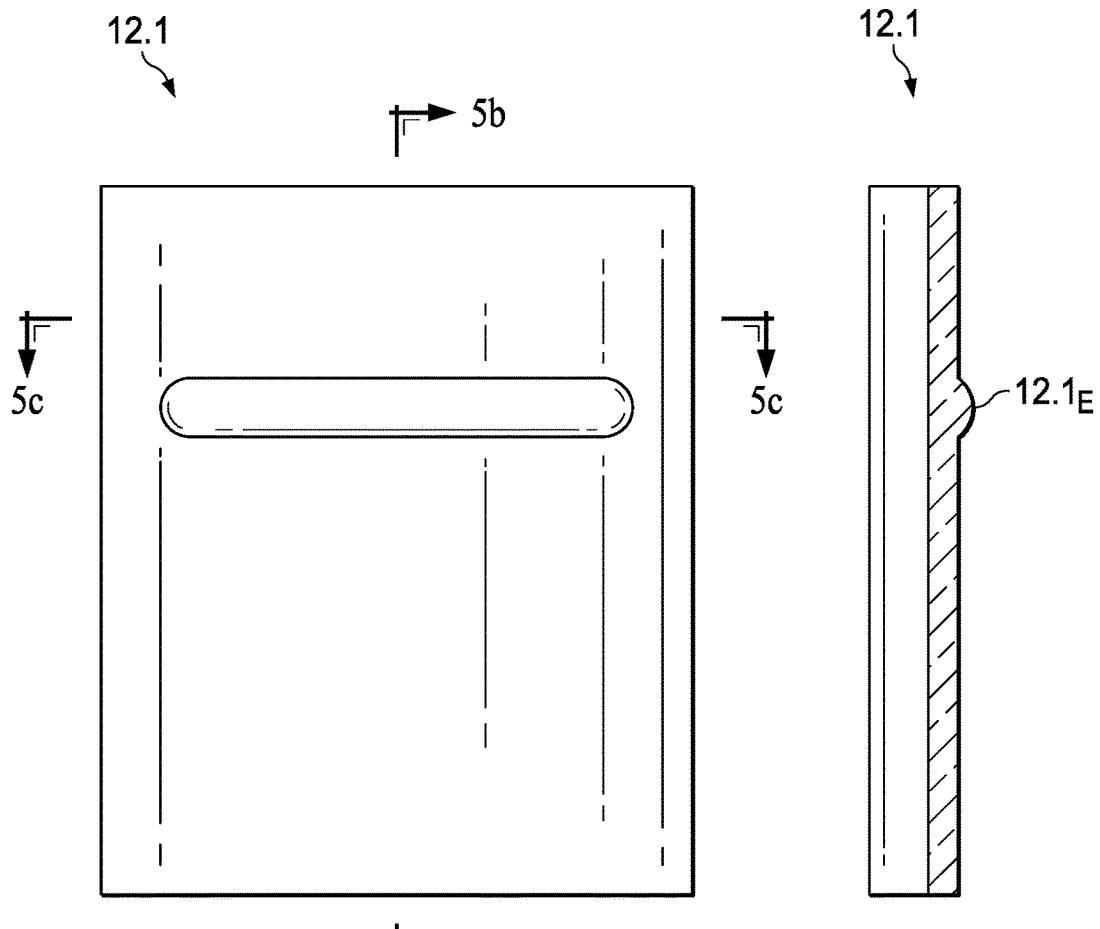
FIG. 5a
FIG. 5b
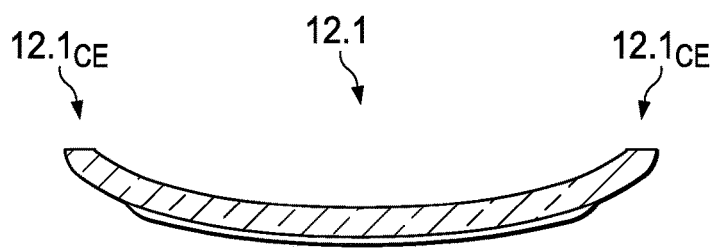
FIG. 5c

NEAR-INFRARED EMITTING TOUCH SCREEN

CROSS-REFERENCE TO RELATED APPLICATION

This application is a continuation of U.S. patent application Ser. No. 14/588,271 filed Dec. 31, 2014, which is fully incorporated herein by reference.

BACKGROUND

This relates to digital screen displays and more particularly to touch screen displays.

Touch screen technology refers to the ability of a screen device to detect and position fix when and where a finger, or some other element, makes contact with the screen. Such technology is growing in popularity and may be found in an increasing number of applications, including various types of displays that appear as monitors/televisions in homes, offices, and vehicles. One type of display is the rear projection display, which is characterized by some type of projecting device that is located behind the screen, that is, on the opposite side of the screen from the side that is viewed by a user. Newer rear projecting devices implement differing technologies to modulate the image that is displayed, including DLP® technology from Texas Instruments Incorporated.

Various conventional approaches have been implemented to attempt touch screen detection in rear projection devices, although such approaches also may have limitations.

One conventional approach to rear projection touch screen technology is to include one or more infrared (IR), or near-IR, elements, and a camera, inside the projector (i.e., on the non-viewer side of) and at positions away from the screen. In operation, each IR or near-IR element emits its respective light toward and through the rear side of the screen so that, desirably, as a finger or other object touches the front of the screen, the finger/object is illuminated by the IR/near-IR light and the camera captures the reflection of the IR/near-IR light from the finger/object. Next, photo-imaging circuitry processes the camera-captured data and attempts to discern the reflection captured by the camera and associate a screen position with the reflection as corresponding to a screen touch. While this approach has some level of accuracy in detecting screen touches, it also is vulnerable to errors due to apparatus that are often included in the path of the IR/near-IR light. More particularly, displays usually include one or more light directing layers or apparatus, for purposes of directing the internally-projected light image accurately and aesthetically to a viewer of the screen. For example, a Fresnel lens is commonly included, which accepts rear projected light and attempts to normalize it all to a direction perpendicular to the screen. As another example, a diffuser is also commonly included, which receives the normalized light from the Fresnel lens and then diffuses some of it off the axis from which it was received, so as to allow some viewers to see an acceptable image quality from an axis other than directly in front of the screen. As a final example, the display may include other light affecting apparatus/layers, including one to reduce glare or reject ambient light that exists on the viewer's side of the screen. However, recalling that the touch detection is enabled by IR/near-IR emitters inside the projector, any one or more of these layers/apparatus may affect the light as it passes from the emitter, toward such layers/apparatus, in an effort to reach a finger/object as it approaches or touches the viewer side of the screen. Specifically, such layers/apparatus may cause additional reflections, thereby creating non-uniformity reflections or so-called "hot spots" that are captured by the IR/near-IR sensing camera. These captured non-uniformities may be wrongfully interpreted as screen touches or may require extensive additional signal processing so as to distinguish from actual screen touches.

Another conventional approach to rear projection touch screen technology again uses a camera inside the projector, along with an IR, or near-IR, illuminator adjacent the outside/viewer side of the screen. The light from the illuminator is passed through a lens (usually cylindrical) that thereby projects the light in a "curtain" or "fan" across a majority or all of the viewer's side of the screen. An interactive touch thus interrupts the light curtain, thereby causing reflections, and the camera and processing technology is akin to that described above, so as to attempt to detect a reflection and its position relative to the screen area. This approach also has some level of accuracy in detecting screen touches, but likewise has drawbacks. For example, some modern and anticipated displays include curvatures or other interruptions or departures from the traditional planar surface—the single illuminated curtain is not feasible for such structures.

Still another conventional approach to rear projection touch screen technology again uses a camera inside the projector, and in this instance the IR/near-IR light is applied or injected to an edge of the screen, which may be an acrylic material. This approach requires the maintenance of total internal reflection (TIR), in which the refractivity of the screen material and air have a certain ratio so that, when undisturbed, the edge-injected light reflects solely within the screen material. When a touch occurs at the screen, however, this frustrates the TIR, thereby permitting light reflections that were formerly maintained within the screen material to release, and that release may be detected by the related camera. This approach also has some level of accuracy in detecting screen touches, but likewise has drawbacks. For example, various restraints and considerations are required to maintain the TIR. As another example, as was the case with the light curtain approach, the introduction of screen curvature causes difficulty if not an impossibility of implementing this approach, as such curvatures may eliminate the ability to maintain an adequate TIR.

SUMMARY

A screen has first and second sides to receive at least one beam on the first side and to display an image on the second side opposite the first side. The beam represents the image. The first side includes a collimating structure to direct the beam from the first side through first striped regions of the screen to the second side. The screen includes second striped regions, positioned between the first and second sides, to emit near-IR light to the second side in response to an excitation source that is selected from a group consisting of an electrical excitation source and a photoluminescence excitation source. The second side includes a diffusion layer. The first side is viewable to detect a portion of the emitted near-IR light reflected back from the second side through the first striped regions to the first side. The detected portion is processable to determine a position touch on the second side.

BRIEF DESCRIPTION OF THE DRAWINGS

FIG. 5a illustrates a frontal view of a curved screen.

FIG. 5b illustrates a first cross-sectional view of the curved screen of FIG. 5a.

FIG. 5c illustrates a second cross-sectional view of the curved screen of FIG. 5a.

DETAILED DESCRIPTION OF EXAMPLE EMBODIMENTS

Figure 1:
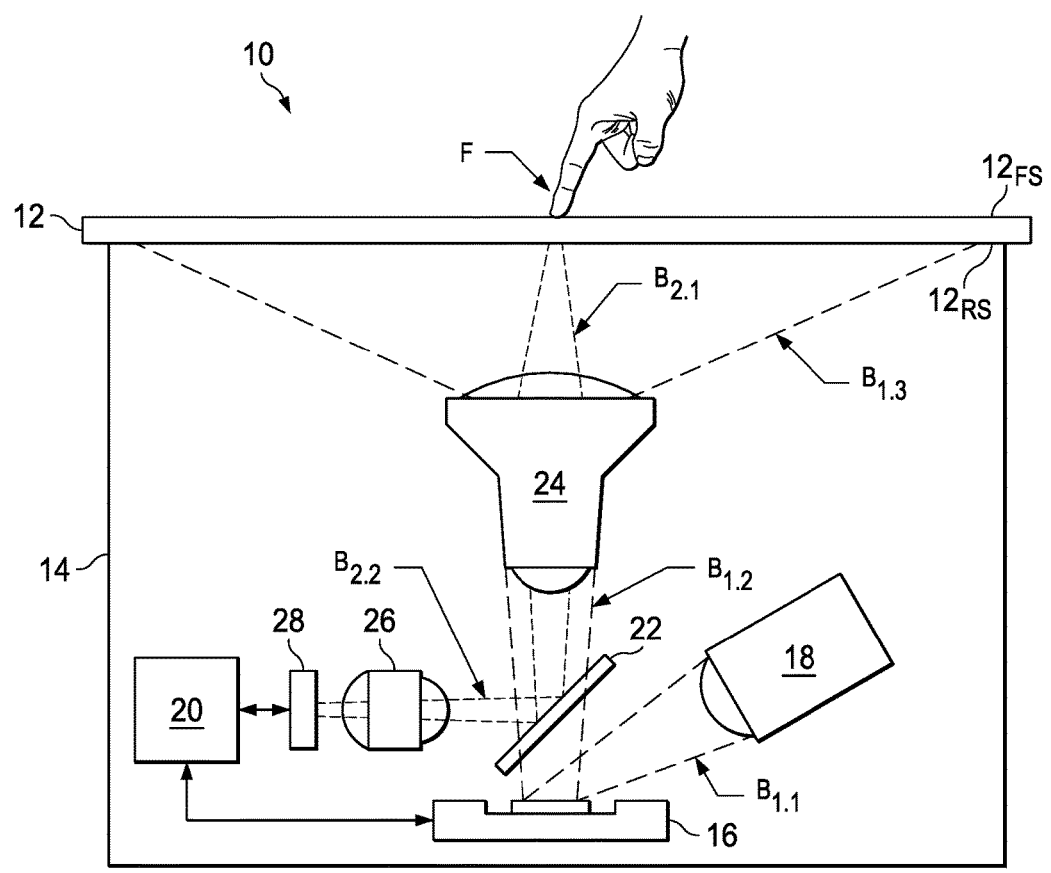
FIG. 1 illustrates a diagrammatic view of a touch screen display system according to an embodiment.

FIG. 1 illustrates a diagrammatic view of a touch screen display system 10 according to an embodiment. System 10 includes a screen 12, having a front surface $12_{FS}$ (i.e., the viewing side) and a rear surface $12_{RS}$, mounted relative to a support structure 14, such as a housing or frame. While not explicitly shown in FIG. 1, but as demonstrated later herein, screen 12 includes one or more layers of apparatus/materials, providing at least the function of displaying on front surface $12_{FS}$ an image to a viewer, where other functions may include light shaping (e.g., collimating, diffusing) for issues of image uniformity and angle of viewership, as well as ambient (i.e., outside of the interior defined by screen 12 and structure 14) light rejection. As also detailed below and by way of introduction to example embodiments, screen 12 also emits a light, preferably near-infrared, away from front surface $12_{FS}$ so that an object, such as a finger F, when approaching or touching the screen, causes a reflection of the near-IR light, and that reflection is detected and located to support touch-screen functionality.

System 10 further includes, within the interior of support structure 14, apparatus for projecting an image toward rear surface $12_{RS}$, so that the image is thereby displayed and visible from front surface $12_{FS}$. Accordingly, for example, such apparatus includes an image source 16, as may be a digital micromirror device (DMD) array, as is commercially available as part of DLP® technology from Texas Instruments Incorporated. The DMD array can range from 0.2 to over an inch in diagonal dimension and includes over a million tiny, highly reflective micromirrors (sometimes called spatial light modulators) forming a micro-electrical-mechanical system, whereby each mirror may be individually tilted to selectively reflect light, as a pixel, from an illumination source 18. The light from illumination source 18 may include one or more light sources, such as red/green/blue (RGB), that may combine to form myriad colors, and is shown and referred to herein for sake of reference as a light beam $B_{1.1}$. A processing circuit 20 represents hardware and/or software for light and image control and processing, which may therefore include a digital signal or other processor, memory, and related apparatus. Processing circuit 20 thus receives or stores image data that is converted to the appropriate control signals for the mirrors of image source 16, and illumination is provided by source 18, so that the reflected light matches the pattern/color of the desired image data, and the reflected light produces a light beam $B_{1.2}$ shown in FIG. 1 reflecting upward; beam $B_{1.2}$ passes through a dichroic filter 22 that transmits visible light and shorter wavelengths while reflecting near infrared light and longer wavelengths to provide an input to a first end of a projection lens 24. Projection lens 24 expands the width of beam $B_{1.2}$ to produce a corresponding, but wider, output beam $B_{1.3}$ from a second end of projection lens 24 and that accommodates the dimensions of screen 12, which may be in the range of 15 inches tall and 9 inches wide. The expanded, projected light passes through the layering of screen 12 and thereby presents an image on front surface $12_{FS}$.

As introduced above and as further detailed below, screen 12 emits a preferably near-IR light at least in a direction away from surface $12_{FS}$ (and away from the interior of support structure 14). Near-IR light is usually considered to be in the range from about 780 nm to 1,000 nm, but in some instances may reach upward to 2,500 nm. Thus, as an object external from support structure 14 approaches and/or touches front surface $12_{FS}$, part of the screen-emitted near-IR light reflects back through screen 12, toward the interior of support structure 14. To illustrate this latter aspect, FIG. 1 further shows a reflected near-IR beam $B_{2.1}$, passing from a tip of a finger F, through screen 12, to the second end of projection lens 24. Beam $B_{2.1}$ is thusly converted to a beam $B_{2.2}$, which reflects off dichroic filter 22 and passes through an additional lens 26 that images the screen onto a camera 28. Accordingly, lens 26 magnifies and focuses the backside of the screen onto the camera sensor array area. Camera 28, which may be implemented with CMOS or other sensors, and with the interaction of processing circuit 20, is able to distinguish the reflection from beam $B_{2.1}$ (and beam $B_{2.2}$ or others in that light path such as from lens 26) from any additional received light and to approximate a coordinate position (e.g., x, y) of the location at which the finger F is touching front surface $12_{FS}$.

Figure 2A:
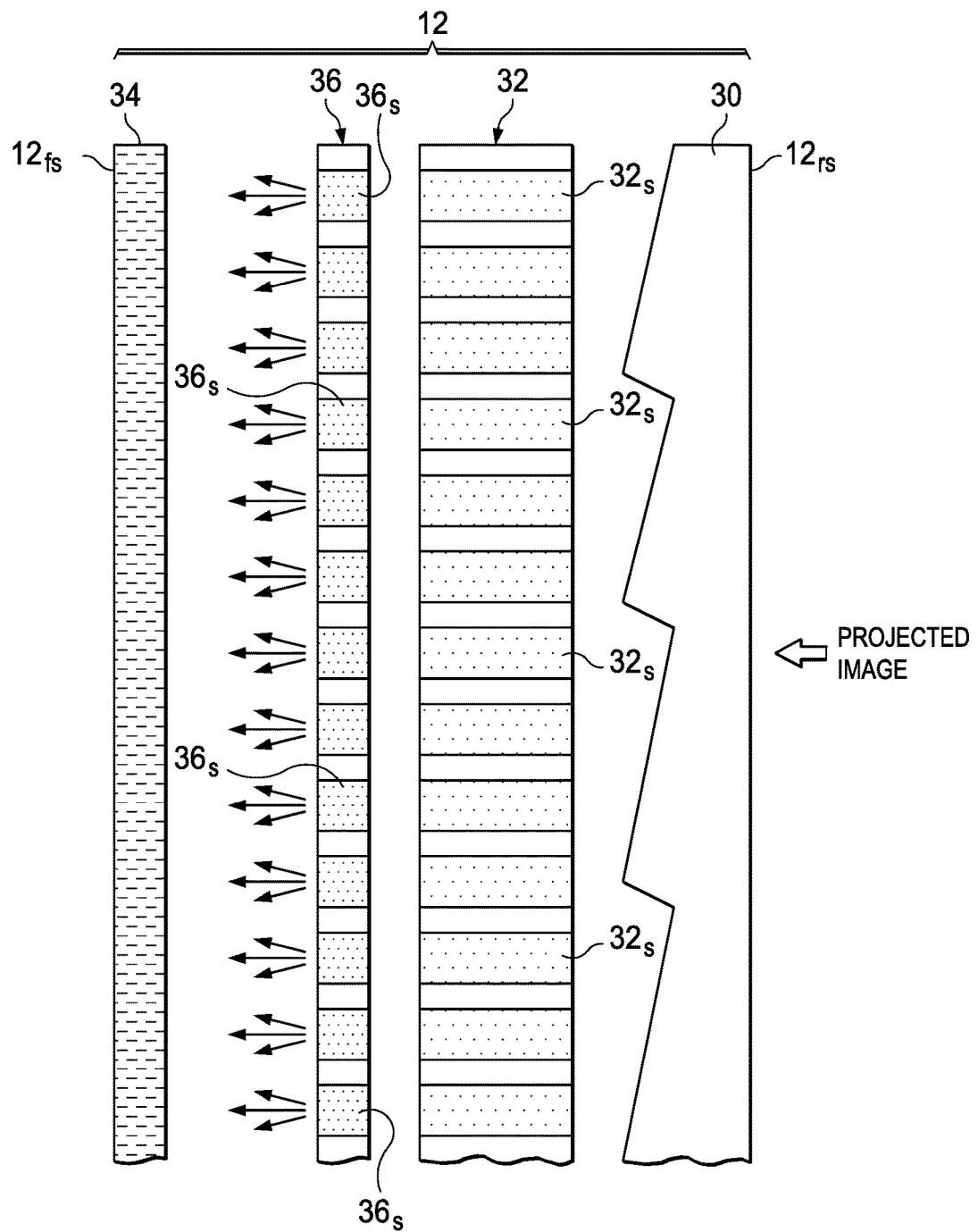
FIG. 2a illustrates a side cross-sectional exploded view.
Figure 2B:
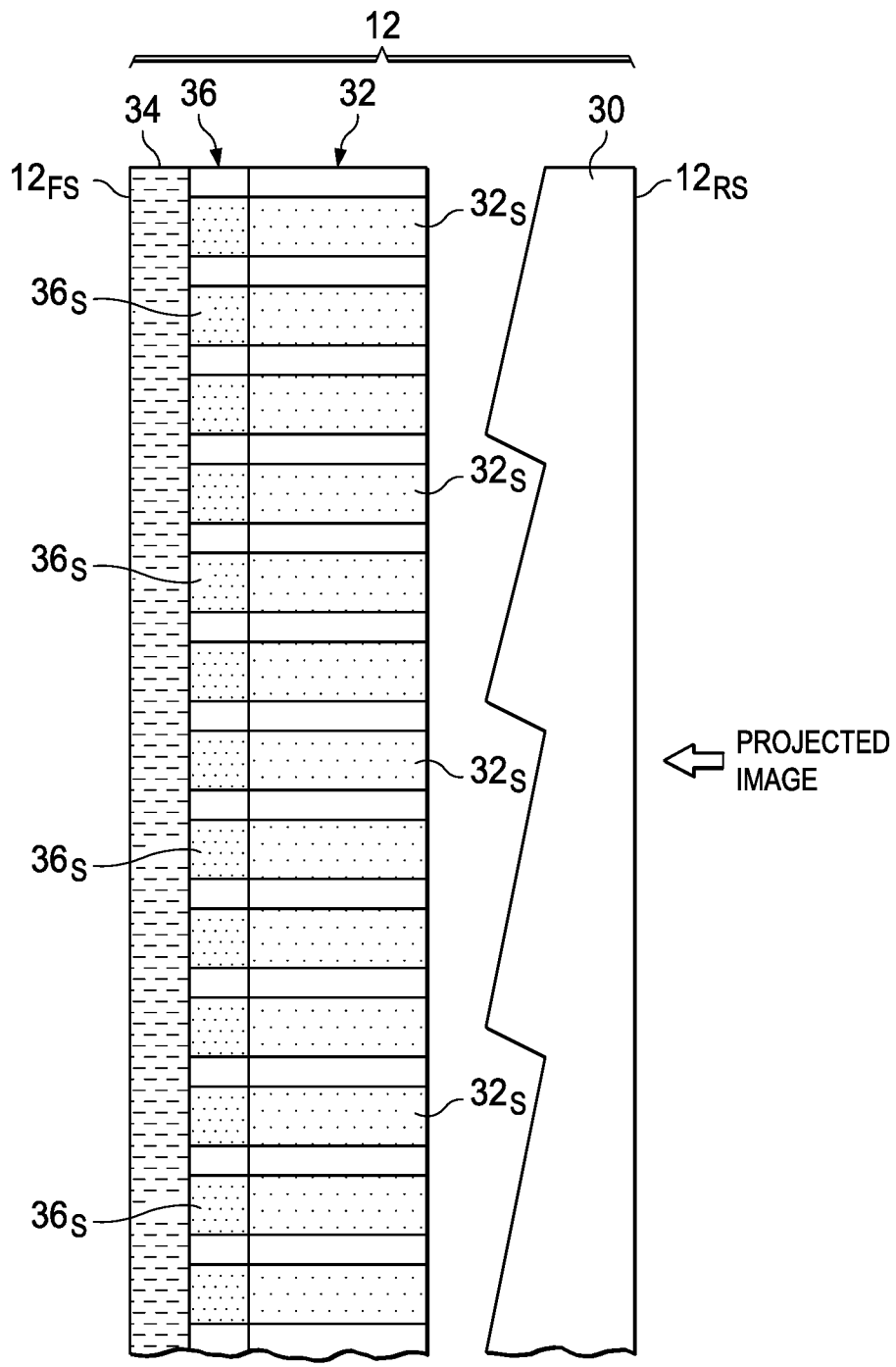
FIG. 2b illustrates a side cross-sectional exploded view, of various layers to be included in the screen 12 of FIG. 1.

FIG. 2a illustrates a side cross-sectional exploded view, and FIG. 2b illustrates a side cross-sectional view, of various layers to be included in screen 12 of FIG. 1. Looking generally from right to left, each of FIGS. 2a to 2b, rear surface $12_{RS}$ is one side of a Fresnel lens 30, which is to receive the projected image (e.g., beam $B_{1.3}$ in FIG. 1). The opposing side of Fresnel lens 30, includes various non-linear edges or facets, sometimes formed across the screen as concentric rings. Fresnel lens 30 accepts light from rear surface $12_{RS}$ at various angles, and each edge bends light so as to normalize the direction of such light, toward front surface $12_{FS}$, along parallel lines, that is, lines orthogonal to the general plane of screen 12 and thus straight out toward a viewer. Lastly, Fresnel lens 30 is also shown herein by example, as other light turning or collimating structures (e.g., light turning film) may be used as alternatives.

To the left of Fresnel 30 is a lenticular lens 32, within which includes a number of dark stripes $32_S$, only some of which are labeled to simplify the drawing. Preferably, and as shown in the later example of FIG. 2c, each stripe $32_S$ is oriented horizontally with respect to and across the entire width of screen 12; in other embodiments, however, the orientation of such stripes may be in a different direction, such as vertical or various other angles, as may be required for some pixelated displays depending, for example, on pixel pitch or pitch of the stripe, so as to minimize moire effects. Each stripe $32_S$ is very thin in height, such as in the range of tens of micrometers, and adjacent stripes are preferably spaced apart by a distance in the range of tens of micrometers. Stripes $32_S$ may be formed in various manners, including using so-called micro-louvers, and serve the function of rejecting ambient light from front surface $12_{FS}$, such as by absorbing light from the side of front surface $12_{FS}$ so that it is not reflected back to a viewer. In addition, stripes $32_S$ may contribute to the appearance of blackening screen 12 to the viewer.

To the far left in FIGS. 2a and 2b is a diffuser layer 34. Diffuser layer receives projected light from Fresnel 30 (via intermediate layers), and diffuser layer 34 adds a diffusion functionality so that some of the light is scattered away from the path from which it was received on the opposite side of front surface $12_{FS}$. Thus, the scattered light is redirected in many directions away from front surface $12_{FS}$, so as to provide a more desirable image to a viewer that might observe screen 12 from an angle outside of a somewhat straight view. Screen 12 may include additional or alternative layers (not shown), such as an additional clear layer to the right of, or as part of, diffuser layer 34. This layer, as well as others, may be constructed of various materials, such as acrylic, polycarbonate, MBS, or glass. Lastly, diffuser layer 34 is also shown herein by example, because an alternative embodiment may instead implement a lenticular layer.

Figure 2C:
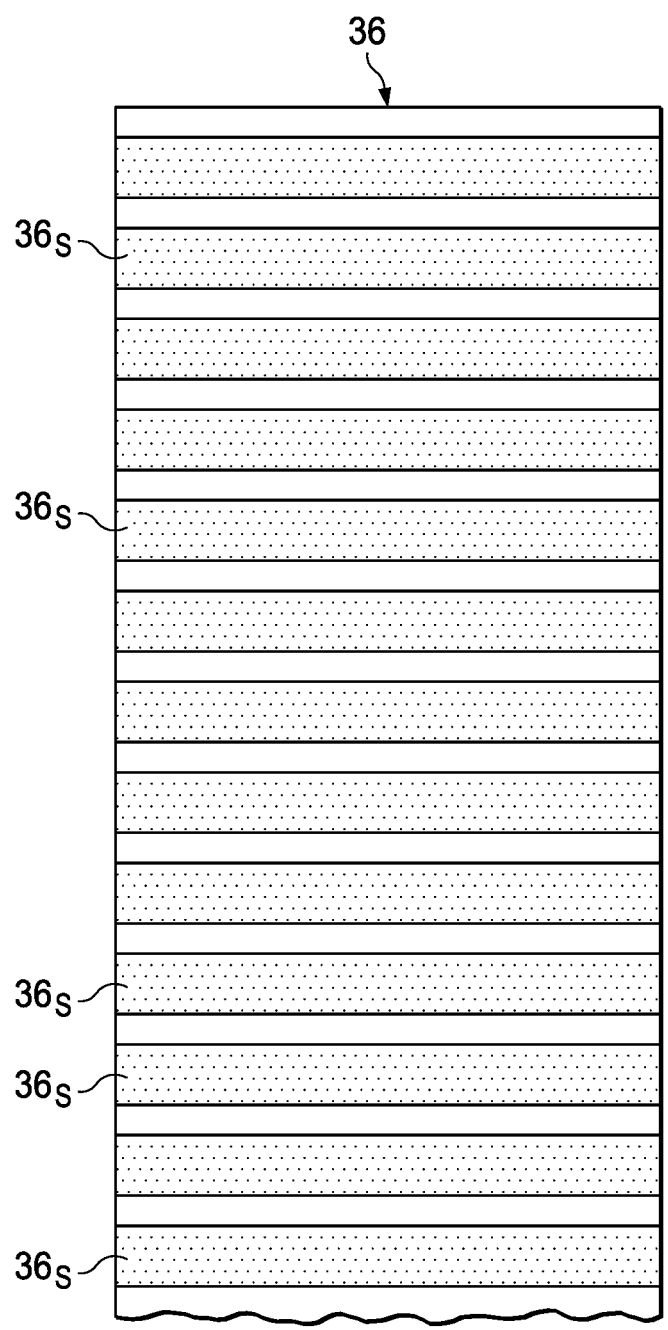
FIG. 2c illustrates a frontal view of a layer 36 of the screen 12 from FIGS. 2a and 2b.

Lastly, to the left of lenticular lens 32, and to the right of diffuser layer 34, is a near-IR emitting layer 36, which is also shown in a frontal view in FIG. 2c. Near-IR emitting layer 36 includes a number of near-IR emitting stripes 36S, only some of which are labeled to simplify the drawing. In an embodiment, each stripe 36S is physically aligned to coincide with a respective stripe 32S on lenticular lens 32. Thus, each stripe 36S has a same orientation (e.g., horizontal; vertical), as well as dimension as a stripe 32S (e.g., 50 um). Each stripe 36S is formed by a material and/or process so as to create an energy-excitable apparatus that is operable to emit near-IR light, preferably in the direction of front surface 12FS, and shown generally in FIG. 2a by an indication of dashed arrows of illumination from each stripe 36S—thus, when screen 12 is fully assembled, such emitted light is preferably away from the interior of support structure 14 and from front surface 12FS. By preferably aligning each stripe 36S with a corresponding stripe 32S, the latter should prevent most near-IR light from the former from traveling back inside the projector. Processes for forming stripes 36S may include printing, molding, deposition, lamination, coating, and still others, as may be selected or ascertained. Moreover, various embodiments exist for certain additional aspects for providing such stripes 36S, as further detailed below. Lastly, near-IR light emitted by layer 36 may be continuously emitted during operation. Or in an alternative embodiment, such light may be modulated, which may have certain additional benefits (e.g., assisting with rejection of ambient light).

Figure 3A:
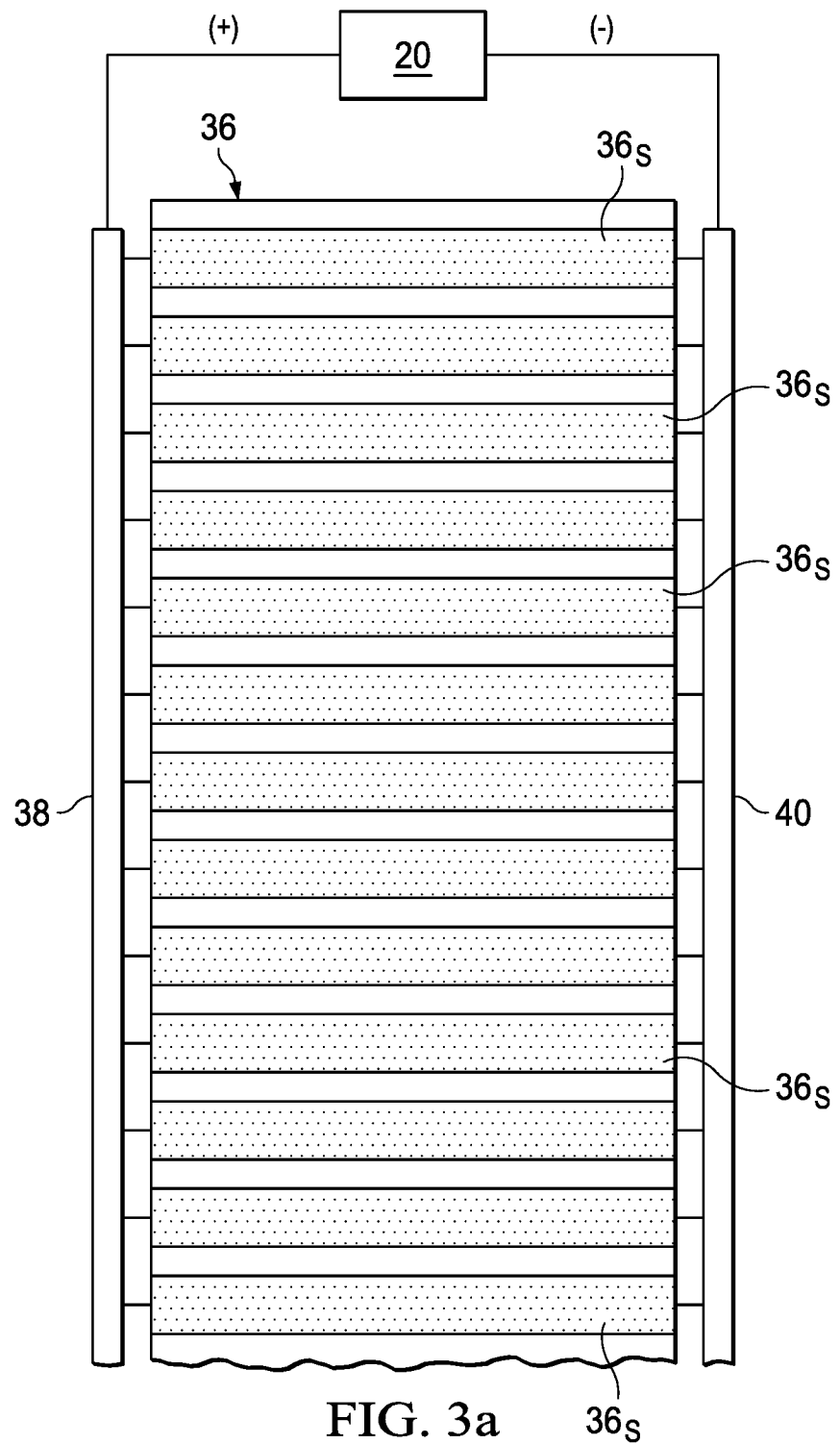
FIG. 3a includes the FIG. 2c layer 36, along with electrodes connected to its near-IR emitting stripes.
Figure 3B:
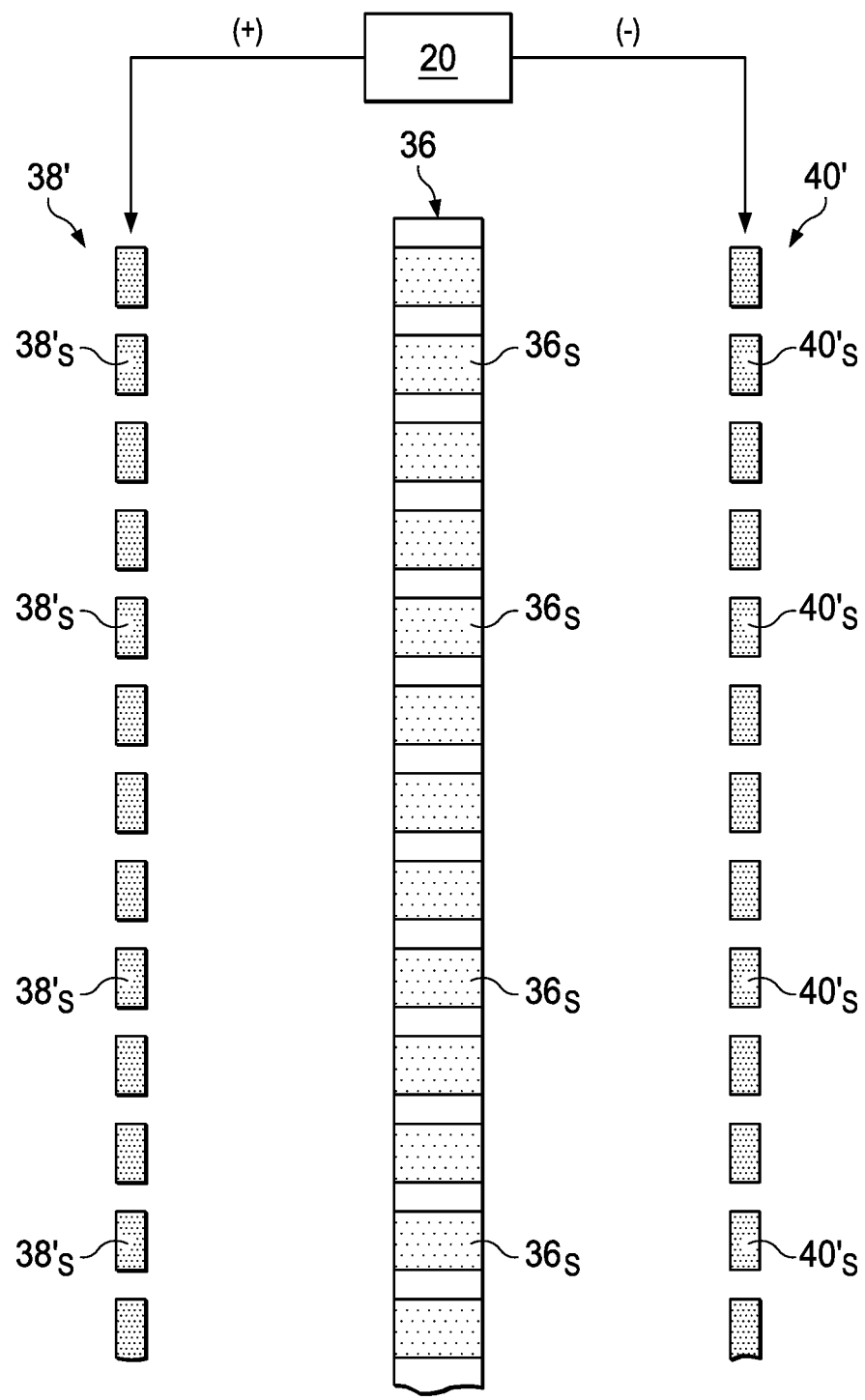
FIG. 3b illustrates a side exploded view of electrodes on both sides of near-IR emitting stripes.

In a first embodiment, stripes $36_S$ are formed from an electroluminescent material, or quantum dots, that will emit near-IR light in response to excitation from electricity. Accordingly, FIG. 3a again includes the FIG. 2c illustration of near-IR emitting layer 34, but diagrammatically adds a first electrode 38 adjacent and electrically coupled to a first end of stripes $36_S$ and a second electrode 40 adjacent and electrically coupled to a second end of stripes $36_S$. Moreover, FIG. 3a further illustrates that processing circuit 20, shown and described earlier in connection with FIG. 1, is electrically coupled to electrodes 38 and 40. Accordingly, at the appropriate timing as ascertainable, processing circuit 20 may apply, or control a power source to apply, opposing bias potentials (e.g., positive voltage and ground) to electrodes 38 and 40, thereby providing an excitation source of electricity so as to cause each stripe $36_S$ to emit near-IR light. Moreover, electrodes 38 and 40 may be implemented in alternative ways. As one example of an alternative, FIG. 3b illustrates a side exploded view of layer 36 as shown in FIGS. 2a and 2b. In addition, FIG. 3b illustrates an alternative embodiment for the electrodes, which appear as electrodes 38' and 40'. In this embodiment, each such electrode 38' and 40' is formed by a number of respective conductive and preferably transparent stripes $38'_S$ and $40'_S$, where such stripes may be joined together by an insulating membrane, member, or the like to form another layer, or they may be individual stripes as shown in the Figure. A conductive and transparent material for electrodes 38' and 40' may be Indium tin oxide (ITO), by way of example. In any event, therefore, each of stripes $38'_S$ and $40'_S$ aligns with a respective near-IR emitting stripe $36_S$, so when the exploded view is combined (e.g., in a manner akin to FIG. 2b), the electrodes may receive a respective electrical signal so as to energize and cause the respective stripe $36_S$ to emit near-IR light. As another example of an alternative for implementing electrodes 38 and 40, the material used in FIGS. 2a and 2b for dark stripes $32_S$ may be chosen as a conductive material, in which case layer 32 will serve as both as one conductor $40'_S$ as shown in FIG. 3b, as well as the ambient light rejecting function described earlier. Then, a separate conductor can be provided for the second conductor, such as shown by conductor 38 in FIG. 3b.

Figure 4:
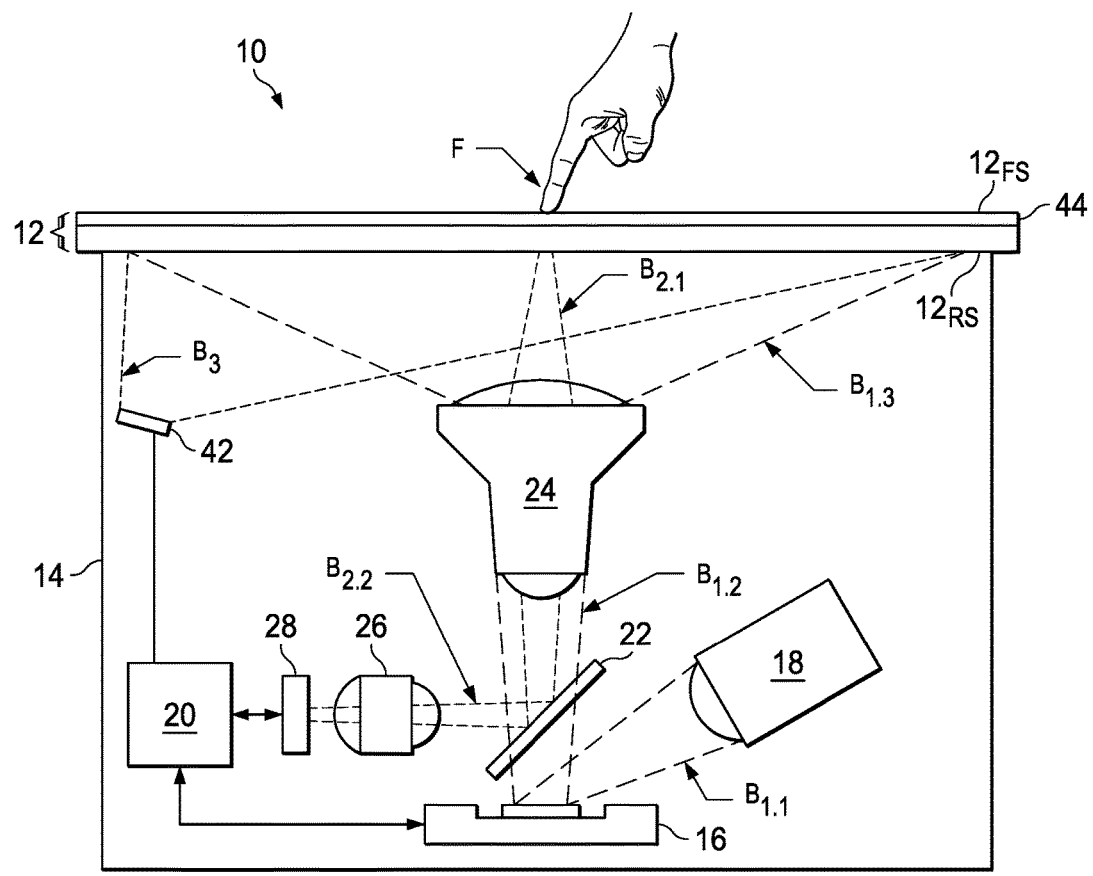
FIG. 4 includes the FIG. 1 illustration of system 10, along with a photoluminescence-excitation source 42.

In a second embodiment, stripes $36_S$ are formed from a material that will emit near-IR in response to excitation from a non-near-IR light source. For example, a phosphor or other substance may be used so as to fluoresce when excited by photons. Accordingly, FIG. 4 again includes the FIG. 1 illustration, which includes screen 12 that is now understood to include a near-IR emitting layer 36. In addition, system 10 includes a photoluminescence-excitation source 42, such as a light emitter for outputting a non-near-infrared beam $B_3$, having a wavelength $\lambda_e$ chosen outside of the near-IR spectrum yet to excite the luminescent material stripes $36_S$ to emit near-IR light. Accordingly, near-infrared light is not originally emitted within support structure 14, but instead wavelength $\lambda_e$ excites the emission of near-infrared light away from front surface $12_{FS}$ and toward the ambient, so that any returned near-infrared light into the interior of support structure 14 will be a reflection, such as beam $B_{2.1}$. Further accordingly, in this embodiment, this chosen wavelength $\lambda_e$ should be such that beam $B_3$ passes through dark stripes $32_S$, that is, of a wavelength $\lambda_e$ for which the material for dark stripes $32_S$ is optically transparent. In addition, both the chosen wavelength $\lambda_e$, and the responsiveness of camera 28, should be such that camera 28 does not detect any reflections of beam $B_3$ (i.e., any reflection of the non-near-IR $\lambda_e$), but rather, only that of the reflected near-IR from beam $B_{2.1}$ (and beam $B_{2.2}$ and the additional beam from lens 26). Lastly, for this second embodiment, screen 12 also may include an additional layer 44 that allow the emitted near-IR to pass, while also: (1) blocking both the internal source of the chosen wavelength $\lambda_e$ from reaching ambient; and (2) blocking any external source that also may have the chosen wavelength $\lambda_e$. For example, if the chosen wavelength $\lambda_e$ corresponds to ultraviolet (UV) light, then layer 44 could: (1) prevent the internal source of that light from exiting system 10 and potentially reaching a viewer's eyes; and (2) at the same time layer 42 blocks any external source (e.g., sunlight) from undesirably exciting the stripes $36_S$.

FIG. 5a illustrates a frontal view of a curved screen 12.1. FIG. 5b illustrates a first cross-sectional view of curved screen 12.1 of FIG. 5a, and FIG. 5c illustrates a second cross-sectional view of curved screen 12.1 of FIG. 5a. In all events, FIGS. 5a-5c demonstrate that an additional embodiment further includes the use of a non-planar screen, in contrast for example to various conventional approaches.

Thus, screen 12.1 may include various layers consistent with this description, and in particular near-IR emitting layer 36. In this manner, near-IR light is emitted relative to screen 12.1, regardless of non-planar or non-linear features. As one example, screen 12.1 is shown to include a design element 12.1$_E$ that may cause a protrusion from the screen, as seen in the cross-section of FIG. 5*b*. As another example, screen 12.1 is shown to include curved ends 12.1$_{CE}$. Such features may be useful for various applications, such as in-vehicle displays and the like. Regardless of such features, however, the embodiment's functionality of accurate touch screen position detection is maintained.

From the above, various embodiments provide numerous improvements. Such improvements include a display, preferably rear projecting, that has a screen with apparatus included to emit near-IR light away from the screen in response to an excitation source, such as electricity or another non-near-IR light source. Moreover, various other aspects have been described, and still others will be ascertainable from this description. For example, while certain dimensions have been provided, variations are anticipated. As another example, the material of stripes 36$_S$ also may be in the gaps between stripes 32$_S$, although this could affect perceived contrast. As yet another example, the ordering of the layers of screen 12 may be adjusted, for example by having layer 36 closest to the viewer, followed by layer 32, then layer 34, and Fresnel lens 30. Thus, while various alternatives have been provided according to the disclosed embodiments, more are contemplated.

Modifications are possible in the described embodiments, and other embodiments are possible, within the scope of the claims.

What is claimed is:

1. A display device, comprising:
    a screen including: a first side including a collimating structure; a second side including a diffusion layer; a first layer; and a second layer;
    the first layer being positioned between the second layer and the first side, the first layer including first striped regions and second striped regions;
    the second layer being positioned between the first layer and the second side, the second layer including third striped regions and fourth striped regions;
    the screen configured to direct a beam from the first side to the second side via the first striped regions of the first layer and via the third striped regions of the second layer, the third striped regions being physically aligned with the first striped regions; and
    the fourth striped regions configured to emit near-IR light to the second side in response to an excitation source, the excitation source selected from a group consisting of an electrical excitation source and a photoluminescence excitation source, the second striped regions configured to reject light from the second side, and the second striped regions being physically aligned with the fourth striped regions.

2. The display device of claim 1, wherein the fourth striped regions include electroluminescent material.

3. The display device of claim 1, wherein the fourth striped regions include quantum dots.

4. The display device of claim 1, wherein the excitation source is the photoluminescence excitation source, the display device further comprises a housing that in combination with the screen defines a display interior, and the screen includes material to block light from the photoluminescence excitation source against reaching outside of the display interior.

5. The display device of claim 1, wherein the excitation source is the photoluminescence excitation source, the display device further includes a housing that in combination with the screen defines a display interior, the photoluminescence excitation source has a wavelength $\lambda_e$, and the screen includes material to block light having the wavelength $\lambda_e$ against reaching the fourth striped regions from outside of the display interior.

6. The display device of claim 1, wherein the fourth striped regions include phosphor.

7. The display device of claim 1, wherein the second and fourth striped regions are aligned horizontally relative to an orientation of the screen.

8. The display device of claim 1, wherein the second and fourth striped regions are aligned vertically relative to an orientation of the screen.

9. The display device of claim 1, wherein the collimating structure includes a Fresnel layer.

10. The display device of claim 1, wherein: the first side is viewable to detect a portion of the emitted near-IR light reflected back from the second side through the third striped regions and the first striped regions to the first side; and the detected portion is processable to determine a position touch on the second side.

11. The display device of claim 1, wherein the screen forms a planar surface.

12. The display device of claim 1, wherein the screen forms a non-planar surface.

13. The display device of claim 1, wherein the excitation source is the electrical excitation source, the fourth striped regions include electroluminescent apparatus, and the screen includes first and second electrodes configured to energize the electroluminescent apparatus.

14. The display device of claim 13, wherein the first electrode, the second electrode, and the electroluminescent apparatus are physically aligned with each other.

15. The display device of claim 14 wherein the first electrode, the second electrode, and the electroluminescent apparatus are physically aligned with each other as stripes.

16. The display device of claim 13, wherein the first and second electrodes include a transparent material.

17. The display device of claim 13, wherein the first electrode includes a transparent material, and the second electrode includes a material configured to reject light from the second side.

18. The display device of claim 1, wherein the fourth striped regions are configured to continuously emit the near-IR light to the second side during operation of the display device.

19. The display device of claim 1, wherein the fourth striped regions are configured to emit the near-IR light to the second side in a modulated manner during operation of the display device.

20. The display device of claim 1, further comprising a housing that in combination with the screen defines a display interior, wherein the fourth striped regions are configured to emit the near-IR light to the second side toward outside of the display interior.

* * * * *